US009697847B2

(12) United States Patent
Dehghani et al.

(10) Patent No.: US 9,697,847 B2
(45) Date of Patent: Jul. 4, 2017

(54) ACOUSTIC SIGNAL PROCESSING SYSTEM CAPABLE OF DETECTING DOUBLE-TALK AND METHOD

(71) Applicant: Semiconductor Components Industries, LLC, Phoenix, AZ (US)

(72) Inventors: Pejman Dehghani, Kitchener (CA); Robert L. Brennan, Kitchener (CA); James Ryan, Ottawa (CA)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 419 days.

(21) Appl. No.: 13/829,457

(22) Filed: Mar. 14, 2013

(65) Prior Publication Data

US 2014/0278381 A1 Sep. 18, 2014

(51) Int. Cl.
*G10L 25/90* (2013.01)
*G10L 21/00* (2013.01)
*G10L 21/0232* (2013.01)
*H04M 9/08* (2006.01)

(52) U.S. Cl.
CPC ......... *G10L 21/0232* (2013.01); *H04M 9/082* (2013.01)

(58) Field of Classification Search
CPC ...... H04M 9/082; H04M 3/002; H04M 9/085; H04M 1/2535; H04B 3/234; H04B 3/21; G10L 21/0208; G10L 2021/02082; G10L 25/78; G10L 21/02
See application file for complete search history.

(56) References Cited

U.S. PATENT DOCUMENTS 5,721,772 A * 2/1998 Haneda et al. .......... 379/406.14
6,236,731 B1 5/2001 Brennan et al.
6,240,192 B1 5/2001 Brennan et al.
6,516,050 B1 * 2/2003 Tasaki .................... H04B 3/234 370/286
6,606,391 B2 8/2003 Brennan et al.
7,016,507 B1 3/2006 Brennan
7,110,554 B2 9/2006 Brennan et al.
7,672,462 B2 3/2010 Schneider et al.
7,783,032 B2 8/2010 Abutalebi et al.
8,041,028 B2 10/2011 Adeney
8,064,966 B2 11/2011 Herve et al.
8,600,038 B2 * 12/2013 Mohammad et al. ... 379/406.09
2002/0041678 A1 4/2002 Basburg-Ertem et al.
2002/0126855 A1 * 9/2002 Terada et al. .................. 381/93
2003/0053646 A1 3/2003 Nielsen et al.
2003/0235294 A1 * 12/2003 Dyba et al. .............. 379/406.01
2004/0071284 A1 * 4/2004 Abutalebi et al. ....... 379/406.08
2005/0152534 A1 * 7/2005 Lipari et al. ............. 379/406.08
2005/0243995 A1 * 11/2005 Kang et al. .............. 379/406.01
2007/0280473 A1 * 12/2007 Suzuki .................. H04M 9/082 379/406.01

(Continued)

*Primary Examiner* — Michael Ortiz Sanchez
(74) *Attorney, Agent, or Firm* — Rennie William Dover

(57) ABSTRACT

An acoustic signal processing system and method. In accordance with an embodiment, the acoustic signal processing system includes an adaptive filter that filters a signal from a frequency band reservation module and generates a filter signal that is received by a subtractor. The subtractor generates an error signal that is used by a double-talk indicator module to generate a control signal that indicates the presence of double-talk.

10 Claims, 6 Drawing Sheets

(56) References Cited

U.S. PATENT DOCUMENTS

| | | | | |
|---|---|---|---|---|
| 2008/0031467 | A1* | 2/2008 | Haulick et al. | 381/66 |
| 2008/0101622 | A1 | 5/2008 | Sugiyama | |
| 2008/0130907 | A1* | 6/2008 | Sudo | G10L 21/0208 381/66 |
| 2008/0181392 | A1* | 7/2008 | Zad-Issa | 379/406.08 |
| 2008/0255829 | A1* | 10/2008 | Cheng | 704/201 |
| 2008/0298601 | A1 | 12/2008 | Rahbar | |
| 2009/0028355 | A1 | 1/2009 | Ishiguro | |
| 2009/0185515 | A1* | 7/2009 | Sorensen et al. | 370/310 |
| 2009/0202063 | A1 | 8/2009 | Frauenthal et al. | |
| 2009/0245502 | A1* | 10/2009 | Liu | 379/406.08 |
| 2009/0279685 | A1 | 11/2009 | Tan | |
| 2009/0323924 | A1* | 12/2009 | Tashev et al. | 379/406.05 |
| 2010/0034373 | A1 | 2/2010 | Dyba et al. | |
| 2010/0063809 | A1 | 3/2010 | Trump | |
| 2010/0086122 | A1* | 4/2010 | Takada | 379/406.08 |
| 2010/0142714 | A1 | 6/2010 | Schneider et al. | |
| 2010/0311471 | A1* | 12/2010 | Herve et al. | 455/569.2 |
| 2011/0058667 | A1* | 3/2011 | Takada | 379/406.08 |
| 2011/0110526 | A1* | 5/2011 | Ishibashi et al. | 381/66 |
| 2011/0150067 | A1* | 6/2011 | Takada | H04M 9/082 375/227 |
| 2011/0170683 | A1* | 7/2011 | Lu et al. | 379/406.01 |
| 2012/0195438 | A1 | 8/2012 | Wu et al. | |
| 2012/0250852 | A1* | 10/2012 | Rowley | 379/406.01 |
| 2012/0307980 | A1* | 12/2012 | Krishnaswany | 379/3 |
| 2012/0323583 | A1* | 12/2012 | Miyasaka et al. | 704/500 |
| 2013/0012275 | A1 | 1/2013 | Kobayashi | |

* cited by examiner

10
RX
RECEIVER
17
ANALYSIS FB
18
N
14
FREQUENCY BAND RESERVATION MODULE
40
N
20
SYNTHESIS FB
22
32
H
44
N
46
ANALYSIS FB
26
24
34
NOISE ATTENUATION MODULE
76
ACOUSTIC SHOCK DETECTOR
78
NOISE REDUCTION CIRCUIT
80
k
48I1
48I2
48I3
DOUBLE-TALK INDICATOR MODULE
48
NLP
50
12
28
SYNTHESIS FB
30
TRANSMISSION DEVICE
52
TX

150
RX
RECEIVER
17
ANALYSIS FB
18
14
N
FREQUENCY BAND RESERVATION MODULE
40
20
N
SYNTHESIS FB
22
32
H
44
46
NOISE ATTENUATION MODULE
76
ACOUSTIC SHOCK DETECTOR
78
NOISE REDUCTION CIRCUIT
80
k
48I1
48I2
48I3
DOUBLE-TALK INDICATOR MODULE
48
NLP
50
12
28
SYNTHESIS FB
30
TRANSMISSION DEVICE
52
TX
ANALYSIS FB
26
24
34

160
RX
RECEIVER
17
ANALYSIS FB
18
14
N
FREQUENCY BAND RESERVATION MODULE
40
N
20
N
SYNTHESIS FB
22
32
H
44
N
FREQUENCY BAND RESERVATION MODULE
40A
N
46
ANALYSIS FB
26
24
34
NOISE ATTENUATION MODULE
ACOUSTIC SHOCK DETECTOR
78
NOISE REDUCTION CIRCUIT
80
76
k
N
N
48I1
48I2
48I3
DOUBLE-TALK INDICATOR MODULE
48
N
NLP
50
12
N
28
SYNTHESIS FB
30
TRANSMISSION DEVICE
52
TX

170
RX
RECEIVER
17
ANALYSIS FB
18
N
FAR-END SPEECH DETECTION MODULE
172
12A
N
FREQUENCY BAND RESERVATION MODULE
40
N
SYNTHESIS FB
22
32
48A
SIGNAL INTERPRETATION MODULE
72
NEAR-END SPEECH DETECTION MODULE
70
LOW PASS FILTER
68
k
ANALYSIS FB
26
34
N
NLP
50
SYNTHESIS FB
30
TRANSMISSION DEVICE
52
TX

ACOUSTIC SIGNAL PROCESSING SYSTEM CAPABLE OF DETECTING DOUBLE-TALK AND METHOD

BACKGROUND

The present invention relates, in general, to telecommunications and, more particularly, to a system and methods for detecting an interfering signal in voice communication.

In acoustic communications, interfering signals degrade the acoustic signal transmission. For example, in telephony applications an acoustic signal may be transmitted by a far-end device and received by a near-end device, where the near-end device outputs the signal through, for example, a speaker. Some of this signal may be picked up by a near-end microphone and transmitted to the far end. If the level of the loudspeaker signal is sufficiently high, the far-end talker would hear an echo, which is annoying. Techniques for removing this echo have been described in U.S. Patent Application Publication No. 2012/0307980 A1 by Arvindh Krishnaswany, titled "Audio Quality and Double Talk Preservation in Echo Control for Voice Communications," published on Dec. 6, 2012. An interfering signal that complicates the removal of echo signals is double-talk. Double-talk occurs when the individuals at the near-end and the far-end side of an acoustic communications system speak simultaneously. Detecting double-talk has been difficult and has been discussed in U.S. Patent Application Publication No. 2008/0101622 A1 by Akihiko Sugiyama, titled "Signal Processing Method, Signal Processing Device, and Signal Processing Program," and published on May 1, 2008, U.S. Pat. No. 8,041,028, titled "Double-Talk Detection," issued to Kathryn Adeney on Oct. 18, 2011, and U.S. Pat. No. 8,064,966, titled "Method of Detecting Double Talk Situation for a 'Hands-Free Device," issued to Michael Herve et al. on Nov. 22, 2011.

Accordingly, it would be advantageous to have a structure and method for detecting double-talk. It would be of further advantage for the structure and method to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
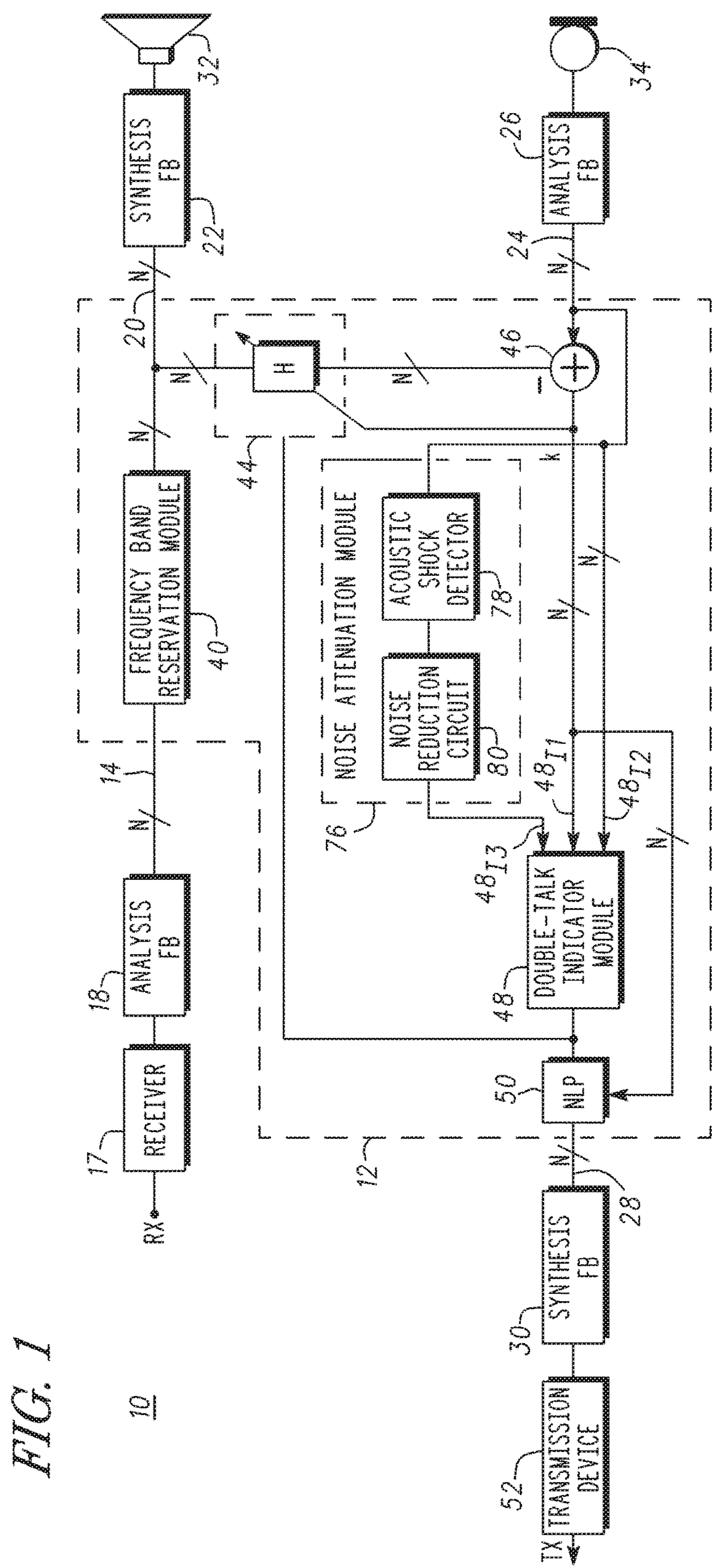
FIG. 1 is a block diagram of an acoustic signal processing system in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated.

DETAILED DESCRIPTION

Generally, the present invention provides an acoustic signal processing system capable of detecting double-talk and a method for processing the acoustic signal that may include double-talk. In accordance with an embodiment, the acoustic signal processing system includes a frequency band reservation module configured to output first and second signals. An adaptive filter is connected to one of the input side or the output side of the frequency band reservation module. A subtractor is connected to the adaptive filter and to a double-talk indicator module. A non-linear processor may be connected to the double-talk indicator module.

In accordance with another embodiment, an acoustic signal processing system is provided that includes a frequency band reservation module configured to have a plurality of output channels connected to a double-talk indicator module. A speech detector may be connected between the double-talk indicator module and the frequency band reservation module.

In accordance with another embodiment, a method for processing an acoustic signal is provided that comprises reserving a first frequency band of a digital audio signal having a plurality of frequency bands of a first acoustic signal to generate a modified acoustic signal. The digital audio signal including the first frequency band is transformed into an acoustic signal. The modified acoustic signal is transformed into a second acoustic signal. In addition, a composite signal is transformed into a modified composite signal, which modified composite signal comprises a component of the acoustic signal. An error signal is generated in response to the modified composite signal. Speech activity is searched for in the first frequency band of the modified composite signal and an echo is searched for in the modified composite signal. A double-talk detection signal is generated in response to the presence of speech activity and the echo signal.

In accordance with another embodiment a method for processing acoustic signals is provided, where a first acoustic signal is divided into a plurality of frequency bands. Speech content of at least one frequency band of the plurality of frequency bands is suppressed to form a modified first acoustic signal. The modified first acoustic signal is transformed into an analog acoustic signal. An error signal is generated from a mixed signal that comprises a mixture of the analog acoustic signal and a second acoustic signal. A double-talk indicator signal is generated in response to speech detection in the mixed signal.

FIG. 1 is a block diagram of an acoustic signal processing system 10 capable of detecting double-talk in accordance with an embodiment of the present invention. What is shown in FIG. 1 is an acoustic signal processing module 12 having an input 14 connected to an analysis filterbank 18, an output 20 connected to a synthesis filterbank 22, an input 24 connected to an analysis filterbank 26, and an output 28 connected to a synthesis filterbank 30. Analysis filterbanks 18 and 26 are connected to audio receiver 17 and acoustic transducer 34, respectively, and synthesis filterbanks 22 and 30 are connected to acoustic transducer 32 and audio transmitter 52, respectively. By way of example, audio receiver 17 may be a digital or analog receiver capable of receiving wired or wireless audio signals; acoustic transducer 34 may be a microphone; acoustic transducer 32 may be a loudspeaker; and audio transmitter 52 may be a digital or analog transmitter capable of transmitting wired or wireless audio signals. Audio receivers may be referred to as audio reception devices, reception devices, or signal receivers and acoustic transmitters may be referred to as transmission devices or signal transmitters.

Audio signal processing module 12 and filterbanks 18, 22, 26, and 30 can be elements or modules of or, alternatively, form a two-way communications system such as, for example, a speakerphone, a computer system, mobile and tablet communications devices, a TV set-top box, a personal VoIP device, or the like. In accordance with an embodiment in which audio signal processing module 12 and filterbanks 18, 22, 26, and 30 are modules within a speakerphone, audio receiver 17 receives audio signals from a far-end source and acoustic transducer 32 broadcasts audio signals in the near-end side of the speakerphone that are processed or modified audio signals received by audio receiver 17. Microphone 34 receives audio signals from near-end sources including audio signals from near-end talkers and the processed or modified audio signals transmitted by loudspeaker 32. Audio transmitter 52 transmits audio signals that have been received by microphone 34 to the far-end source. It should be noted that the term far-end may mean an audio signal source that is located remotely from, for example, a speakerphone, i.e., remotely from audio receiver 17 and audio transmitter 52, and the term near-end may mean an audio signal source that is located near the speakerphone, i.e., near loudspeaker 32 and microphone 34. The far-end device and the near end device are connected to each other through a communication network that can be a wireless communication network or a wired communication network. It should be noted that the near-end signal refers to speech and noise signals generated near microphone 34, excluding the audio signal transmitted by loudspeaker 32, and that the microphone signal transmitted by microphone 34 includes the near-end signal and the audio signal resulting from loudspeaker 32. It should be further understood that the terms near and far are not limitations of the present invention and that they are used as a matter of convenience for describing relative positions. For example the terms may be interchanged depending on the particular application.

Analysis filterbank 18 receives a far-end audio signal, i.e., an audio signal originating from remote audio signal sources such as remote talkers, that is transmitted to the speakerphone via a communications network; synthesis filterbank 22 transmits processed far-end audio signals to a speaker; analysis filterbank 26 receives near-end speech, i.e., speech that is generated by the persons sitting in the room where the speakerphone is located, and other audio signals such as echo; and synthesis filterbank 30 generates an analog audio signal for transmission back to the far-end talkers.

By way of example filterbanks 18, 22, 26, and 30 are oversampled filterbanks, such as over-sampled weighted overlap-add (WOLA) filterbanks WOLA filterbanks are described in U.S. Pat. No. 6,236,731, titled "Filterbank Structure and Method for Filtering and Separating an Information Signal into Different Bands, Particularly for Audio Signal in Hearing Aids," by R. Brennan et al., issued on May 22, 2001, and U.S. Pat. No. 6,240,192, titled "Apparatus For and Method of Filtering in an Digital Hearing Aid, Including an Application Specific Integrated Circuit and a Programmable Digital Signal Processor" by R. Brennan et al., issued on May 29, 2001, which are incorporated herein by reference in their entirety. It should be noted that a WOLA filterbank includes a WOLA analysis filterbank and a WOLA synthesis filterbank. The WOLA analysis filterbank receives an information signal in the time domain and transforms the information signal into a plurality of band signals in the frequency domain, e.g., the information signal is divided into a plurality of frequency bands. The WOLA synthesis filterbank receives a plurality of band signals in the frequency domain and transforms the band signals into an information signal in the time domain. The band signals may be referred to as frequency bands or sub-bands. Thus, filterbank 18 receives an input signal that may be an analog signal or a digital signal and decomposes this time domain signal into N frequency bands, where N is an integer equal to 1 or more. It should be understood that connections between system components such as, for example analysis filterbank 18 and a signal band reservation module 40 may be bus connections having N channels.

Audio signal processing module 12 includes signal a band reservation module 40 having an N-channel input and an N-channel output, where the N-channel input is connected to an N-channel output of analysis filterbank 18 through an N-channel bus and the N-channel output is connected to N-channel inputs of synthesis filterbank 22 and a linear adaptive filter 44 through N-channel buses. Briefly referring to FIG. 2, a block diagram of band reservation module 40 is shown. By way of example, band reservation module 40 includes a digital signal processor 56 configured to control multipliers $\mathbf{58}_1$, $\mathbf{58}_2$, $\mathbf{58}_3$, . . . , $\mathbf{58}_{(k-1)}$, $\mathbf{58}_k$, $\mathbf{58}_{(k+1)}$, . . . , $\mathbf{58}_N$ to provide a complex gain or a complex attenuation to bands, 1, 2, 3, . . . , (k−1), k, (k+1), . . . , N, respectively, where (k−1), k, and (k+1) represent frequency bands between frequency bands 1 and N. More particularly, one or more bands can be suppressed such that the one or more suppressed bands behave as a hole in the frequency bands. It should be noted that the signal path from analysis filterbank 18 to synthesis filterbank 22 may be referred to as the downlink channel or a downlink transmission path.

Referring again to FIG. 1, linear adaptive filter 44 has an N-channel output connected to an N-channel input of a subtractor or subtractor node 46 through an N-channel bus. Subtractor 46 has another N-channel input connected to an N-channel output of analysis filterbank 26 through an N-channel bus and an N-channel output connected to an N-channel input $\mathbf{48}_{I1}$ of a double-talk indicator module 48 and to an N-channel input of a non-linear processor 50 through N-channel buses. Double-talk indicator module 48 further includes an N-channel input $\mathbf{48}_{I2}$ connected to the N-channel output of analysis filterbank 26 through an N-channel bus. Double-talk indicator module 48 has a single channel output connected to a single channel input of non-linear processor 50. It should be understood that double-talk indicator module 48 and non-linear processor 50 have multi-channel inputs, e.g., N-channel inputs, and single channel inputs and multi-channel outputs, e.g., N-channel outputs, and single channel outputs.

Figure 3:
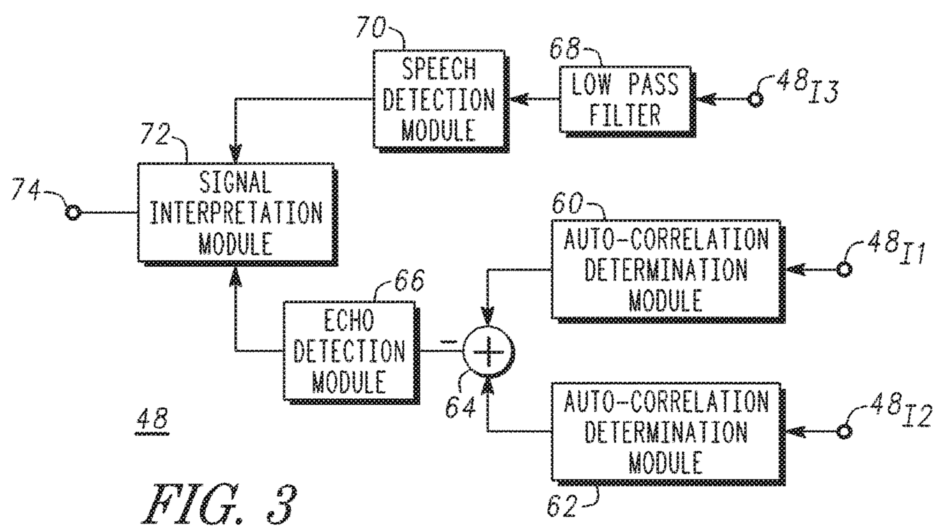
FIG. 3 is a block diagram of a portion of the acoustic signal processing system of FIG. 1 in accordance with an embodiment of the present invention.

Briefly referring to FIG. 3, double-talk indicator module 48 comprises auto-correlation determination modules 60 and 62, a subtractor 64, an echo detection module 66, a low pass filter 68, a speech detection module 70, and a signal interpretation module 72. Auto-correlation determination module 60 has an N-channel input serving as or, alternatively, connected to N-channel input $\mathbf{48}_{I1}$ and an output connected to an input of subtractor 64. Auto-correlation determination module 62 has an N-channel input serving as or, alternatively, connected to N-channel input $\mathbf{48}_{I2}$ and an output connected to another input of subtractor 64. The output of auto-correlation determination module 60 is comprised of a single conduction channel and the output of auto-correlation determination module 62 is comprised of a single conduction channel. Echo detection module 66 has an input connected to the output of subtractor 64 and an output connected to an input of signal interpretation module 72. Low pass filter 68 has an input connected to an input $\mathbf{48}_{I3}$ of double-talk indicator module 48 and an output connected to an input of speech detection module 70.

Optionally, audio signal processing module 12 may include a noise attenuation module 76 that includes an acoustic shock detector 78 having an input connected to or alternatively serving as the noise attenuation module 76 and an output connected to a noise reduction circuit 80. In accordance with an embodiment, the input of noise attenuation module 76 is configured to receive the suppressed frequency band, e.g., frequency band k. An output of noise reduction module 76 is connected to input $\mathbf{48}_{I3}$ of double-talk indicator module 48 shown in FIG. 1. Noise attenuation module 76 attenuates impulse noise, i.e., impulse transients. An acoustic shock detector is described in U.S. Patent Application Publication No. 2010/0142714, titled "Method and System for Acoustic Shock Protection" by T. Schneider et al. and published on Jun. 10, 2010, which is incorporated herein by reference in its entirety. By way of example, the input of noise attenuation module 76 is configured to receive a single band, i.e., band k, of the audio signal. However, this is not a limitation of the present invention and noise attenuation module 76 can be configured so that its input is an N-channel input. It should be noted that at a signal selector may be included at the point at which the signal from analysis filterbank 26 splits to the input of noise attenuation module 76, wherein the signal selector selects the frequency band k as the input signal into noise attenuation module 76.

Signal interpretation module 72 has an input connected to the output of speech detection module 70 and an output 74 that outputs a double-talk detection control signal. By way of example, signal interpretation module 72 performs a logical ANDing of the output signals from echo detection module 66 and speech detection module 70.

Referring again to FIG. 1, non-linear processor 50 has an input connected to an output of double-talk indicator module 48 and to an input of linear adaptive filter 44 and an N-channel output connected to an N-channel input of synthesis filterbank 30 through an N-channel bus. It should be noted that configuring double-talk indicator module and linear adaptive filter 44 in a feedback configuration is optional. Synthesis filterbank 30 has an output connected to an input of audio transmitter 52, which transmits the audio signal from audio signal processing system 10 through the communication channel to the far-end receivers. The signal path from analysis filterbank 26 to synthesis filterbank 30 may be referred to as the uplink channel or an uplink transmission path.

Figure 4:
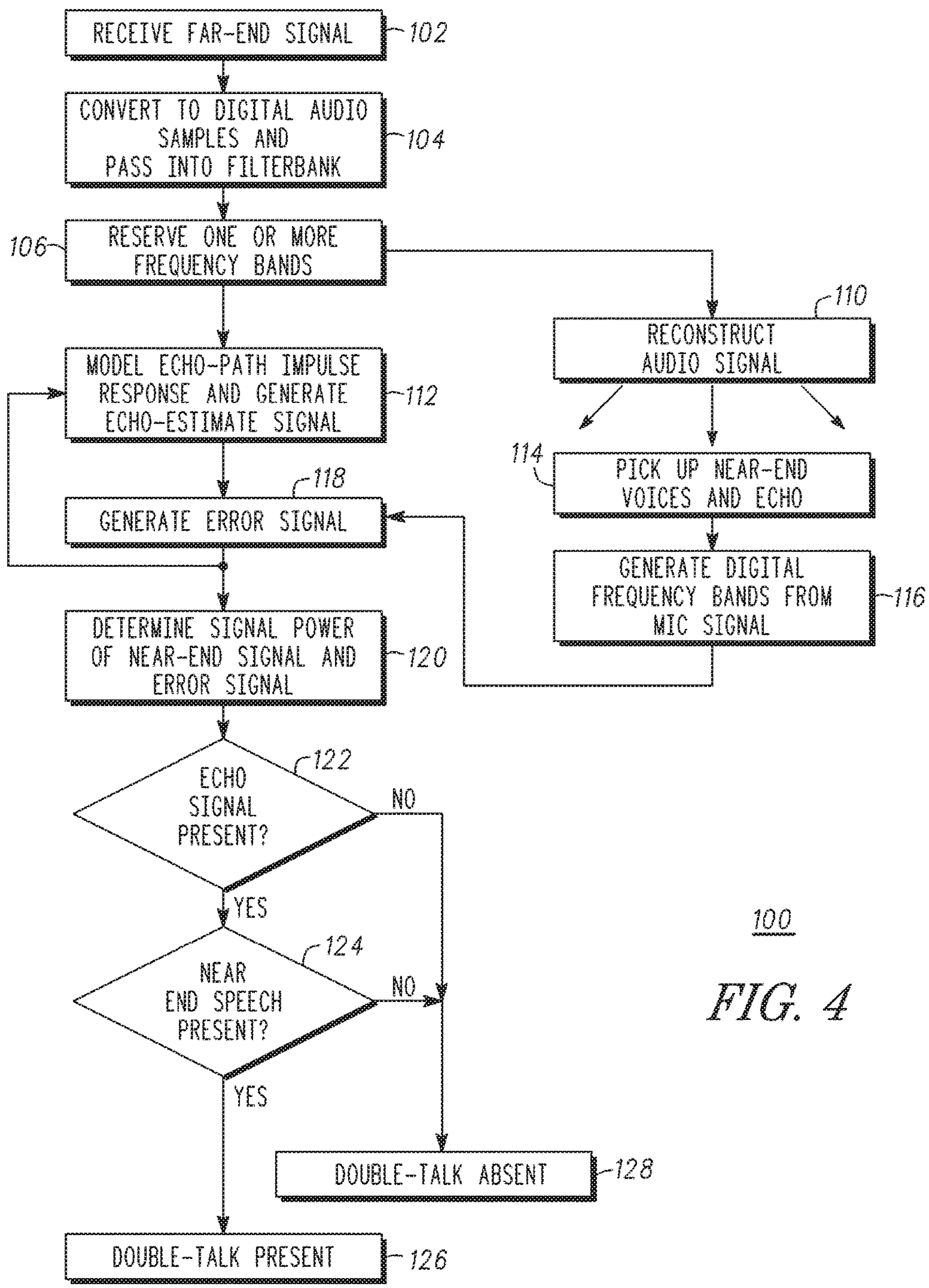
FIG. 4 is a flow diagram for processing an acoustic signal in accordance with an embodiment of the present invention.

Referring now to FIG. 4, a flow diagram 100 illustrating the operation of double-talk detector 10 is shown. In operation, an audio signal generated by one or more individuals at a remote location, e.g., a far end signal or far-end speech, is transmitted through a communications channel and received by audio receiver 17 (identified by box 102). In accordance with an embodiment, double-talk detector 10 includes audio receiver 17 and an audio processing module 12 coupled to filterbanks 18, 22, 26, and 30. Audio receiver 17, which may include a preamplifier and an analog-to-digital (A/D) converter, receives the audio signal generated by the far-end speech, digitizes the received audio signal, and transmits the digitized audio signal to filterbank 18, which filterbank 18 divides the audio signal into a plurality of frequency bands (identified by block 104). For example, FIG. 2 illustrates filterbank 18 dividing the digitized audio signal into N frequency bands, where the number of frequency bands ranges from 1 to N, where frequency bands (k−1), k, and (k+1) are intermediate frequency bands between band 1 and band N.

Filterbank 18 transmits the digitized or digital audio signal to frequency band reservation module 40 which reserves (or suppresses speech content from) one or more frequency bands from the digitized audio signal, forming a modified digitized or digital audio signal that, in essence has suppressed frequency content because of the one or more suppressed frequency bands (identified by box 106). In accordance with an embodiment, the reserved frequency band "k" can be selected by means of a permanent selection process. This technique is suitable for systems in which the bandwidth of the far-end signal is known to be limited but speech energy may still be expected. In accordance with another embodiment, a pseudo-random selection is performed in which the reserved frequency band selection varies with time according to a pseudo-random selection pattern. In accordance with another embodiment, a psycho-acoustically derived selection is performed where the reserved frequency band is chosen based on an analysis of the audio signal to ensure minimal audible disturbance to the audio signal. In addition, frequency band reservation module 40 may include long-term, permanent, or momentary (temporary) suppression of the digitized audio signal in the reserved frequency band. Long-term suppression makes detection of double-talk easier, whereas momentary suppression reduces the audibility of the suppression.

Figure 2:
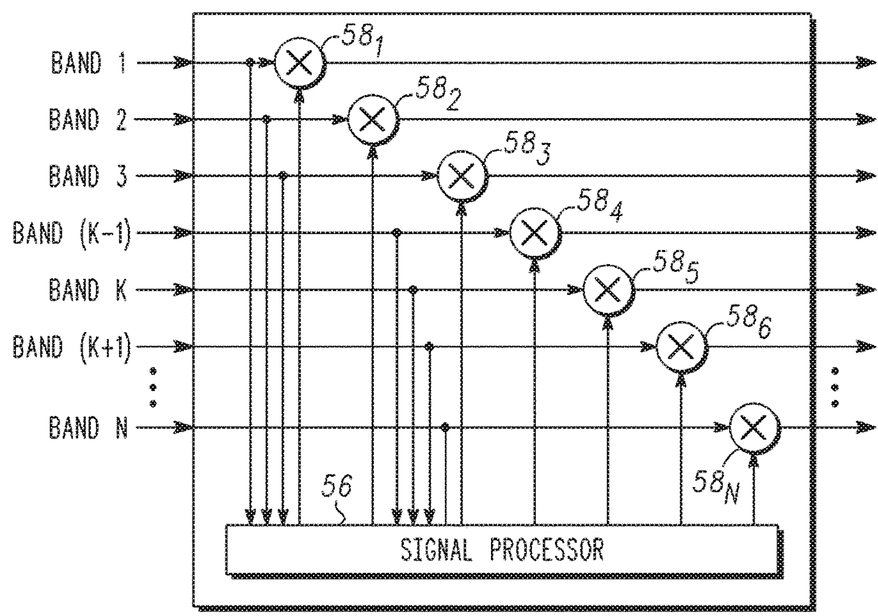
FIG. 2 is a block diagram of a portion of the acoustic signal processing system of FIG. 1 in accordance with an embodiment of the present invention.

Briefly referring to FIG. 2, frequency band reservation module 40 reserves or suppresses a frequency band such as, frequency band k. In this embodiment, audio signal processing system 10 is configured so that frequency band suppression or frequency band attenuation is performed prior to the modified audio signal being received by loudspeaker 32 and linear adaptive filter 44. In this configuration, the frequency band or bands being suppressed, i.e., frequency band k, is transmitted to synthesis filterbank 22 and linear adaptive filter 44, wherein frequency band suppression prior to the adaptive filter reduces or eliminates the possibility of a mathematically generated echo appearing in the error signal in the reserved frequency band. Linear adaptive filters are described in U.S. Pat. No. 7,783,032 B2, titled "Method and System for Processing Subband Signals Using Adaptive Filter," issued to Hamid Reza Abutalebi, et al. on Aug. 24, 2010, which is hereby incorporated herein in its entirety.

Figure 6:
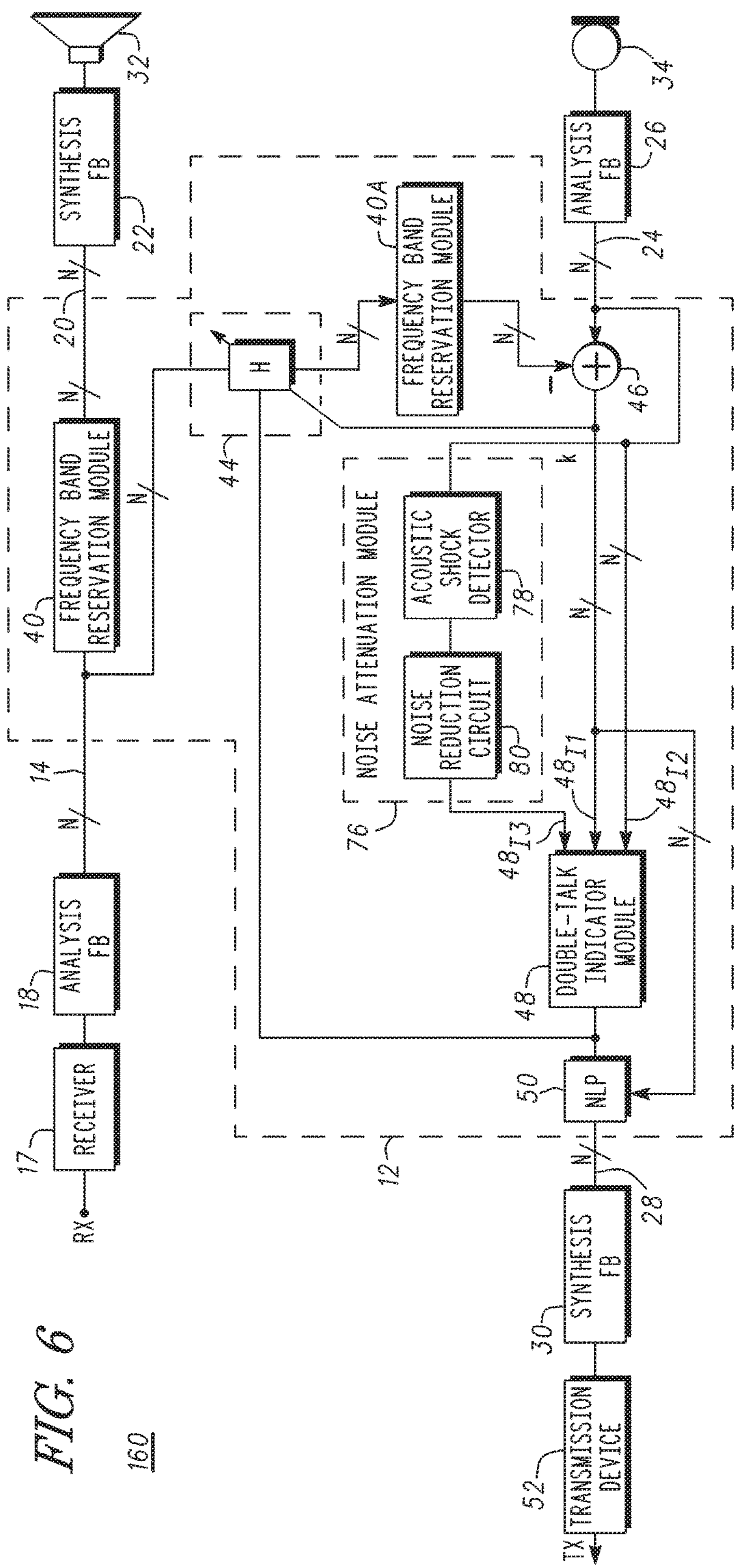
FIG. 6 is a block diagram of an acoustic signal processing system in accordance with another embodiment of the present invention.

It should be noted that if the reservation process occurs on the far-end signal after it has been sent to adaptive filter 44 as occurs in double-talk detector 160 shown in FIG. 6, a mathematically generated echo term may occur in frequency band k of the error signal. This may happen because linear adaptive filter 44 is configured to operate under the assumption that frequency band k of the far end signal that it receives has not been suppressed. Thus, it is assumed that echo is present in frequency band k of the signal transmitted by microphone 34 and an estimate of the echo signal is removed from the microphone signal. However, an echo signal is absent from the signal received by subtractor 46 from linear adaptive filter 44 because it has been suppressed by, for example frequency band reservation module 40A shown in FIG. 6. Performing the frequency band reservation process before transmitting the far-end signal to linear adaptive filter 44 mitigates the probability of generating mathematical echo.

The audio signal received by filterbank 22 and linear adaptive filter 44 are referred to as processed audio signals.

Signal processor 56 operates on multipliers $\mathbf{58}_1$, $\mathbf{58}_2$, . . . , $\mathbf{58}_{(k-1)}$, $\mathbf{58}_k$, $\mathbf{58}_{(k+1)}$, . . . $\mathbf{58}_N$ to attenuate the reserved frequency bands in the audio signal forming an attenuated audio signal. The attenuated audio signal is transmitted to linear adaptive filter 44 and to synthesis filterbank 22.

Synthesis filterbank 22 transforms the resulting audio signal from the frequency domain into the time domain to form a reconstructed audio signal, which is broadcast by the acoustic transducer such as, for example, a loudspeaker 32 in a speakerphone (identified by box 110). Reconstructing the audio signal may be referred to as transforming a modified acoustic signal into another acoustic signal, i.e., the reconstructed audio signal. It should be understood that signal components from the $k^{th}$ frequency band are absent from the reconstructed audio signal. The reconstructed audio becomes intermingled with the sounds at the near-end of the communications system.

Linear adaptive filter 44 generates models of the echo path impulse response and generates an echo estimate signal by generating correlation coefficients in response to the far-end audio signal and the signal appearing at microphone 34, i.e., the near-end signal plus any echo signal from loudspeaker 32 (identified by box 112).

The sounds at the near end which may include, for example, people speaking, room noise, and portions of the reconstructed audio signal are received by microphone 34. The portions of the reconstructed audio signal received by microphone 34 are referred to as echo. Microphone 34 picks up the near end audio signal which may include voices and echo, digitizes the audio signal, and transmits the digitized audio signal to filterbank 26 (identified by box 114). Thus, the microphone signal may be referred to as a composite signal. The signal transmitted by microphone 34 may be referred to as a microphone signal. Filterbank 26, like filterbank 22, divides the digitized audio signal into a plurality of frequency bands. For example, in FIG. 2 filterbank 26 divides the microphone signal into N frequency bands, where the number of frequency bands ranges from 1 to N and includes intermediate frequency bands (k−1), k, and (k+1) (identified by box 116). Thus, filterbank 26 generates a digitized microphone signal that may be referred to as a modified composite signal.

The digitized microphone signal and the digitized filter signal from linear adaptive filter 44 are input into subtractor circuit 46, which subtracts the digitized filter signal from the digitized microphone audio signal to generate an error signal. Thus, an error signal is generated in response to the digitized microphone signal and the digitized filter signal (identified by box 118).

Referring again to FIG. 4, the digitized microphone signal is transmitted along the uplink path to N-channel input $\mathbf{48}_{I2}$ and the error signal is transmitted to input $\mathbf{48}_{I1}$ of double-talk indicator module 48. To detect near-end speech, which occurs in frequency band k of the uplink path, an estimate for the noise floor of frequency band k is calculated in real time by speech detector module 70. In response to the energy in frequency band k being greater than the noise floor plus a predetermined threshold, double-talk indicator module 48 signals the presence of speech. Because the audio signal contents of frequency band k have been suppressed in the reservation process that occurred in the downlink path, the detected speech in the reserved frequency band k in the uplink path comes from the near-end side, where echo is absent in frequency band k. The digitized microphone signal received at input $\mathbf{48}_{I3}$ of double-talk indicator module 48 may be further processed to preclude transient and impulse-like noise from being considered near-end speech. For example, the digitized far-end audio signal from frequency band k may be processed through a noise reduction module to reduce these acoustic artifacts using techniques described in U.S. Pat. No. 7,016,507, titled “Method and Apparatus for Noise Reduction Particularly in Hearing Aids,” issued to Robert Brennan on Mar. 21, 2006, which is hereby incorporated herein by reference in its entirety. In addition, detected speech in frequency band k can be further processed to reduce injection of surface impact sounds such as, for example, putting an object on a table, shutting a door, or other types of environmental noises using techniques described in U.S. Pat. No. 7,672,462, titled “Method and System for Acoustic Shock Protection,” issued to Tod Schneider et al. on Mar. 2, 2010, which is hereby incorporated herein by reference in its entirety.

In response to the signals received at inputs $\mathbf{48}_{I1}$ and $\mathbf{48}_{I2}$, double-talk indicator module 48 determines whether echo is present using the microphone signal and the error signal from subtractor 46, i.e., double-talk indicator module 48 searches for echo in the composite signal. More particularly, double-talk indicator module 48 uses auto-correlation determination module 62 (shown in FIG. 3) to determine the auto-correlation $r_m(\mathbf{0})$ at a lag of 0 samples, i.e., the signal power of the microphone signal received by microphone 34, and auto-correlation determination module 60 to determine the auto-correlation of the error signal $r_e(\mathbf{0})$ at a lag of 0 samples, i.e., the error signal power. Auto-correlation $r_m(\mathbf{0})$ is referred to as an auto-correlation metric of a composite or microphone signal and auto-correlation $r_e(\mathbf{0})$ may be referred to as an auto-correlation metric of the error signal. The error signal may be referred to as the echo-reduced signal (identified by box 120). The auto-correlation values will be used to detect echo in the frequency bands other than the frequency band or bands in which the echo has been suppressed. Double-talk indicator module 48 subtracts the error signal power $r_e$ from the microphone signal power $r_m$. It should be noted that linear adaptive filter 44 determines the correlation between the modified far-end signal and the microphone signal and removes the echo estimate from the microphone signal (assuming linear adaptive filter 44 has successfully converged to the vicinity of the optimal solution). Subtracting the auto-correlation values possesses similar information as a normalized cross-correlation between the microphone signal and the error signal. Echo detection module 66 searches for the presence of an echo signal and signals its presence in response to the difference between the microphone signal power $r_m$ and the error signal power $r_e$, i.e., $r_m(0)-r_e(0)$, being greater than a threshold level, $P_{TH}$. Echo detection module 66 signals the absence of echo in response to the difference between the microphone signal power $r_m$ and the error signal power $r_e$, i.e., $r_m(0)-r_e(0)$, being less than a threshold level, $P_{TH}$, and greater than or equal to zero. Echo detection module 66 transmits the status of the echo, i.e., the echo present or echo absent to signal interpretation module 72 (identified by decision diamond 122).

Still referring to FIG. 3 and in response to the signals received at input $48_{I3}$, double-talk indicator module 48 determines whether speech has been detected, i.e., double-talk indicator module 48 searches for speech activity in the first frequency band of the modified composite signal. More particularly, low-pass filter 68 in cooperation with speech detection module 70 searches for speech activity in the reserved band in the uplink path. Because the echo contents have been suppressed in, for example, reserved frequency band k from loudspeaker 32 (shown in FIG. 1), echo is absent from this frequency band and any detected speech in the reserved frequency band k comes from the near-end side. In response to the detected speech signal, speech detection module 70 transmits a status signal, i.e., a speech signal is present or a speech signal is absent, to signal interpretation module 72 (identified by decision diamond 124). If a speech signal is present and an echo signal is present signal interpretation module 72 generates a control signal, also referred to as a double-talk detection signal at its output 74 indicating the presence of double-talk (indicated by box 126), which control signal appears at an input of non-linear processor 50 and at an input of linear adaptive filter 44. In response to the control signal from double-talk indicator module 48 indicating the presence of double-talk, non-linear processor 50 advantageously uses the indicator signal to mitigate the possibility of a false suppression decision that would normally occur during double-talk due to the inability of the non-linear processor to differentiate between double-talk and echo when echo in the mixture is much louder than near-end speech. Transmitting the control signal from double-talk module 48 to linear adaptive filter 44 allows the filter to optimize its operation during double-talk. Linear adaptive filter 44 reduces echo during echo only periods and during double-talk periods while adding few to no artifacts to near-end acoustic signals in response to the presence of double-talk or in response to near-end acoustic signals from which double-talk is absent. However, similar to non-linear processor 50, it may not be able to differentiate between echo only and double-talk in cases where the echo level is much higher than near-end speech because when echo is much louder than near-end speech the general signal statistics resulting from double-talk and echo-only cases shows little discrimination. When the double-talk detection control signal is present, linear adaptive filter 44 is able to differentiate between the two and optimize its operation during double-talk to reduce more echo from the mixture while preserving the audio signal quality of the part of the signal mixture that is made up of near-end speech. The reconstructed acoustic signal is transmitted by audio transmitter 52 to a communications channel, which may carry the signal to the far-end location.

If either a speech signal or an echo signal is absent, signal interpretation module 72 generates a control signal at its output 74 indicating the absence of double-talk (indicated by box 128). Non-linear processor 50 treats the output signal in accordance with the programming configuration it uses during non-double-talk processing. Generally, non-linear processor 50 aggressively suppresses in response to detecting the presence of echo and does not suppress when it detects near-end speech. In response to the control signal from double-talk indicator module 48 indicating the absence of double-talk, the reconstructed error signal is transmitted to a communications channel via audio transmitter 52, which may carry the signal to the far-end location. It should be noted that the operational details of non-linear processor 50 depend on its particular implementation and are independent of the double-talk detection procedure.

Figure 5:
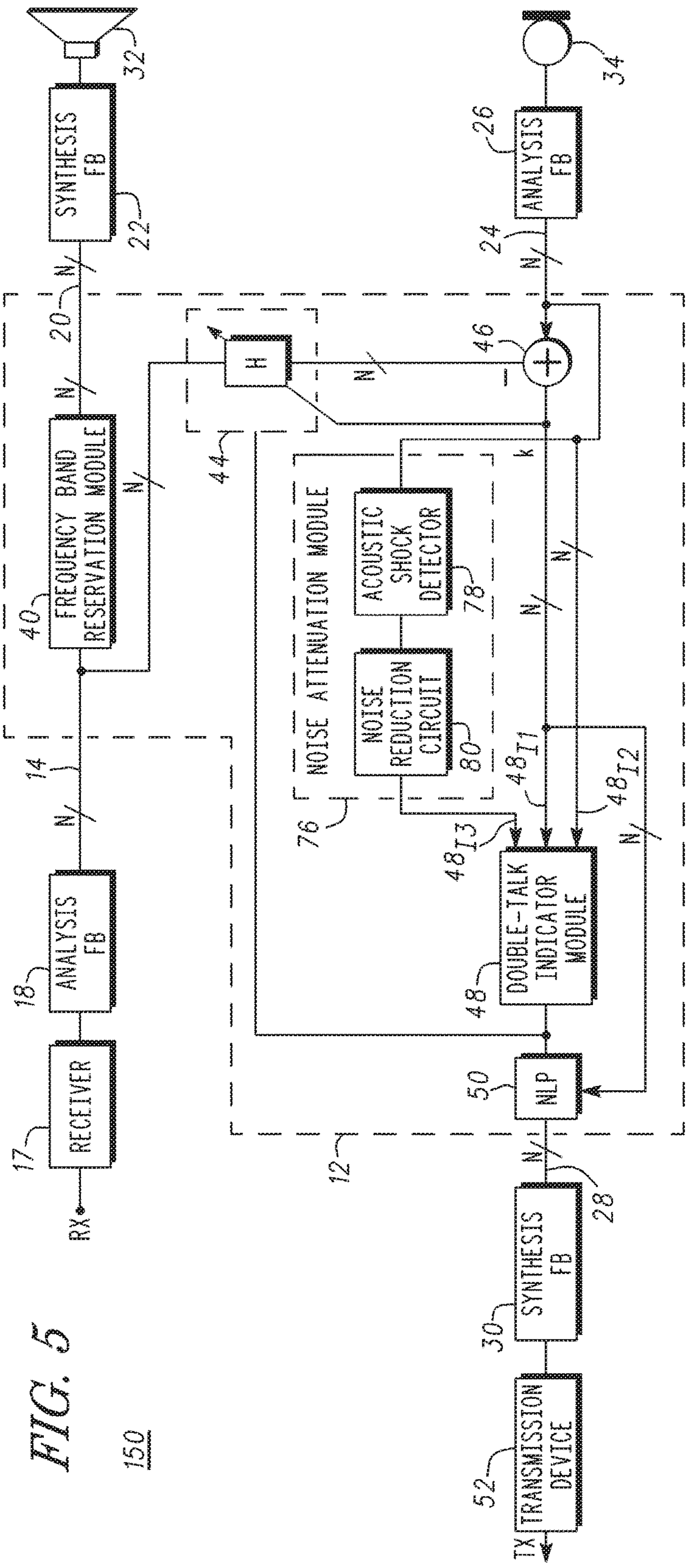
FIG. 5 is a block diagram of an acoustic signal processing system in accordance with another embodiment of the present invention.

FIG. 5 is a block diagram of a double-talk detector circuit 150 in accordance with another embodiment of the present invention. Double-talk detector circuit 150 is similar to double-talk detector circuit 10, except that the N-channel input of linear adaptive filter 44 is connected to the N-channel input of band reservation module 40 rather than to the N-channel output of band reservation module 40. In this configuration, an echo signal may be generated in the reserved band through the subtraction of what is thought to be echo by linear adaptive filter 44 while it does not really exist in the echo path.

FIG. 6 is a block diagram of a double-talk detector circuit 160 in accordance with another embodiment of the present invention. Double-talk detector circuit 160 is similar to double-talk detector circuit 150, except that a band reservation module 40A is connected between the N-channel output of linear adaptive filter 44 and N-channel input of subtractor 46. In this configuration, the same frequency band that was reserved or suppressed in band reservation module 40 is reserved or suppressed by band reservation module 40A to mitigate any unwanted echo generation in the reserved band.

Figure 7:
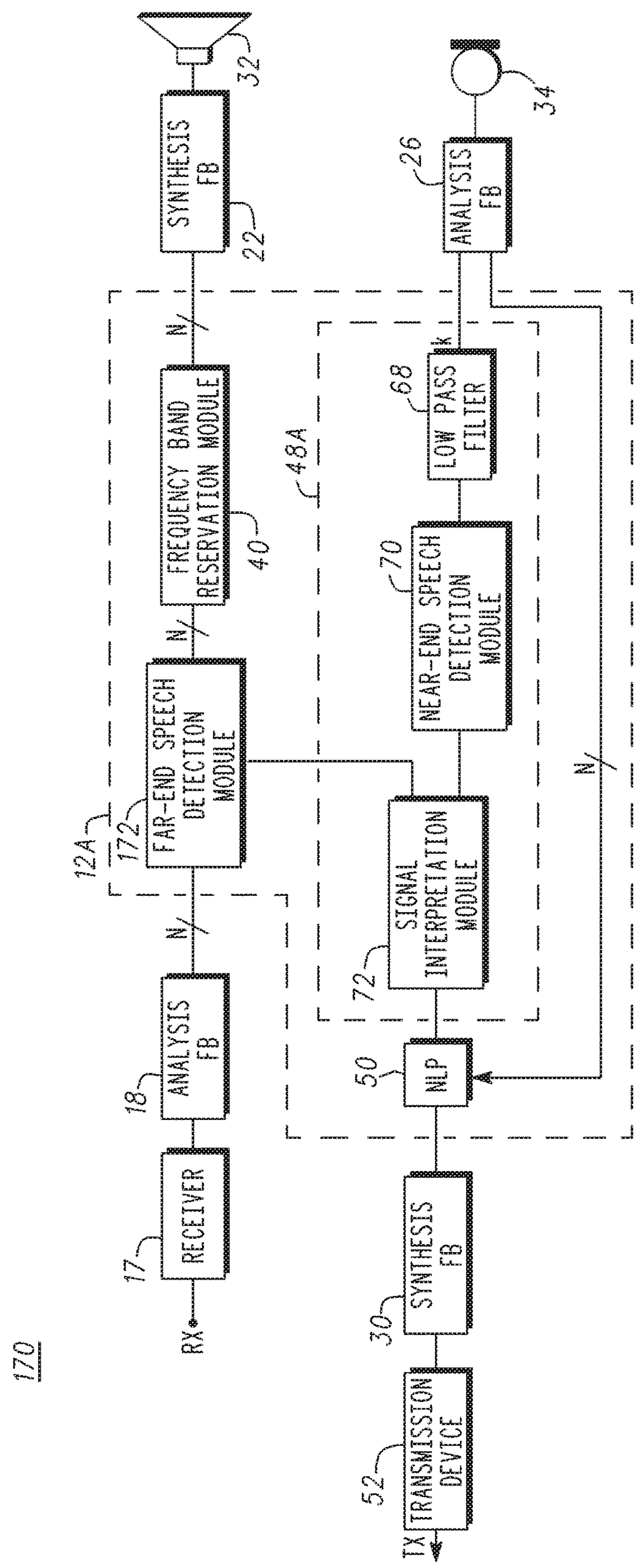
FIG. 7 is a block diagram of an acoustic signal processing system in accordance with an embodiment of the present invention.

FIG. 7 is a block diagram of a double-talk detector circuit 170 in accordance with another embodiment of the present invention. What is shown in FIG. 7 is an acoustic signal processing module 12A having an input connected to analysis filterbank 18, an output connected to synthesis filterbank 22, an input connected to analysis filterbank 26, and an output connected to synthesis filterbank 30. Analysis filterbanks 18 and 26 are connected to audio receiver 17 and acoustic transducer 34, respectively, and synthesis filterbanks 22 and 30 are connected to acoustic transducer 32 and audio transmitter 52, respectively. Acoustic signal processing module 12A includes a far-end speech detector 172 having an N-channel input connected to or, alternatively, serving as an N-channel input of processing module 12A, an N-channel output, and an output. Far-end speech detector 172 is also referred to as a far-end speech detection module. Frequency band reservation module 40 has an N-channel input connected to the N-channel output of far-end speech detector 172 and an N-channel output connected to an N-channel input of synthesis filterbank 22. The other output of far-end speech detector 172 is connected to an input of double-talk indicator module 48A. In accordance with an embodiment, double-talk indicator module 48A includes signal interpretation module 72 having a single channel input and an N-channel input, which N-channel input is coupled to or, alternatively, serves as an N-channel input of double-talk indicator module 48A. Double-talk detector 48A further includes a near-end speech detection module 70 having an output connected to a single channel input of signal interpretation module 72 and an input connected to an output of low-pass filter 68, which low-pass filter has an input coupled to analysis filterbank 26.

FIG. 7 illustrates analysis filterbank 26 as having an N-channel output connected to an N-channel input of non-linear processor 50. An output of signal interpretation module 72 is connected to an input of non-linear processor 50 and an N-channel output of non-linear processor 50 is connected to an N-channel input of synthesis filterbank 30. The output of synthesis filterbank 30 is connected to transmission device 30. Although double-talk detector circuit 170 includes non-linear processor 50, synthesis filterbank 30, and transmission device 52, it should be noted that these are optional elements that may be omitted from a double-talk detector circuit.

The operation of double-talk detector 170 is similar to the operation of double-talk detector 10; however far-end speech is detected in the downlink path and an estimate of the noise floor of the signal is calculated in real time by far-end speech detector 172. In response to the energy of the signal being greater than the noise floor plus a predetermined threshold, far-end speech detector 172 signals the presence of far-end speech.

By now it should be appreciated that a double-talk detector and a method for detecting double-talk have been provided. In accordance with embodiments of the present invention, a double-talk detector indicator module 48 is configured to detect the presence of double talk and to provide control information to non-linear processor 50. In response to detecting the presence of echo and the absence of speech, double-talk detector indicator module 48 issues a control signal to non-linear processor 50 to help in avoiding false suppression of the acoustic signal in cases where echo is much louder than near-end speech. In response to detecting the presence of echo and speech, double-talk detector indicator module 48 issues a control signal to non-linear processor 50 to pass the acoustic signal. Thus, double-talk detector indicator module 48 provides a control signal to non-linear processor 50 to reduce the probability that it will suppress double-talk.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for processing an acoustic signal, comprising:

receiving a first acoustic signal in the time domain;

converting the first acoustic signal in the time domain into a digital audio signal in a sub-band frequency domain;

reserving a first frequency band of the digital audio sub-band frequency signal having a plurality of frequency bands using a frequency band reservation module that includes a digital signal processor and a plurality of control multipliers, wherein a first control multiplier includes a first sub-band frequency input coupled to a first input of the digital signal processor and a second input coupled to a first output of the digital signal processor and a second control multiplier includes a first input coupled to a second input of the digital signal processor and a second input coupled to a second output of the digital signal processor;

transforming the sub-band frequency digital audio signal including the first frequency band into a second acoustic signal using an acoustic transducer;

transforming a third acoustic signal derived from the second acoustic signal and a near end signal into a mixed sub-band frequency signal;

transforming the sub-band frequency digital audio signal into a modified sub-band frequency signal;

generating a sub-band frequency error signal in response to the modified sub-band frequency signal by subtracting the modified sub-band frequency signal from the mixed sub-band frequency signal;

generating a speech activity-indicator in a first reserved frequency band of the mixed sub-band frequency signal in response to the presence of speech activity;

generating an echo activity indicator by subtracting the sub-band frequency error signal from the mixed sub-band frequency signal;

logically ANDing the speech activity indicator and the echo activity indicator to generate a double-talk activity indicator that indicates the presence or absence of double-talk;

generating a second modified digital audio sub-band frequency signal in response to the double-talk activity indicator;

converting the second modified digital audio sub-band frequency signal into a modified time domain signal; and transmitting the modified time domain signal to a receiver for use by a user.

2. The method of claim 1, wherein reserving the first frequency band of the digital audio signal includes suppressing speech content in the first frequency band.

3. The method of claim 1, further including generating a sub-band frequency filter signal in response to the acoustic signal and wherein generating the sub-band frequency error signal includes subtracting the filter signal from the mixed sub-band frequency signal.

4. The method of claim 1, wherein searching for the echo in the mixed sub-band frequency signal includes determining an auto-correlation metric of the sub-band frequency error signal and an auto-correlation metric of the mixed sub-band frequency signal.

5. The method of claim 1, wherein reserving the first frequency band includes permanently suppressing an audio signal in the first frequency band.

6. The method of claim 1, wherein reserving the first frequency band includes configuring a band reservation module to permanently select which frequency band is the first frequency band.

7. The method of claim 1, wherein reserving the first frequency band includes one of pseudo-randomly selecting which band is the first frequency band or psycho-acoustically selecting which band is the first frequency band.

8. A method for processing acoustic signals, comprising:

receiving an acoustic signal in the time domain;

converting the acoustic signal in the time domain into a digital audio signal in a sub-band frequency domain;

dividing the digital audio signal in the sub-band frequency domain into a plurality of frequency bands;

suppressing speech content of at least one frequency band of the plurality of frequency bands to form a modified first acoustic signal using a frequency band reservation module that includes a digital signal processor and a plurality of control multipliers, wherein a first control multiplier includes a first input coupled to a first input of the digital signal processor and a second input coupled to a first output of the digital signal processor and a second control multiplier includes a first input coupled to a second input of the digital signal processor and a second input coupled to a second output of the digital signal processor;

generating a sub-band frequency error signal from a mixed sub-band frequency signal, wherein the mixed sub-band frequency signal comprises a representation of the mixture of the first acoustic signal and another acoustic signal;

generating a speech detection signal using a speech detection module in response to detecting speech in the mixed sub-band frequency signal and detecting echo in the mixed sub-band frequency signal in response to a difference between the mixed sub-band frequency signal and the sub-band frequency error signal, wherein an error indication signal is generated;

logically ANDing the echo indication signal and the speech detection signal to generate a double-talk indicator signal;

generating a modified digital audio signal in the sub-band frequency domain from the double-talk indicator signal;

converting the modified digital audio signal in the sub-band frequency domain into a modified acoustic signal in the time domain; and transmitting the modified acoustic signal in the time domain to a receiver for use by an user.

9. The method of claim 8, further including subjecting the modified first acoustic signal to a filtering process of a sub-band frequency adaptive filter to generate a sub-band frequency filter signal and generating the sub-band frequency error signal by subtracting the sub-band frequency filter signal from the mixed sub-band frequency signal.

10. The method of claim 8, wherein suppressing the speech content includes temporarily suppressing the speech content.

* * * * *